July 10, 1956     W. G. WALDO     2,753,600
DECORTICATING APPARATUS

Filed Sept. 18, 1951     2 Sheets-Sheet 1

INVENTOR
Willis G. Waldo
BY
HIS ATTORNEY

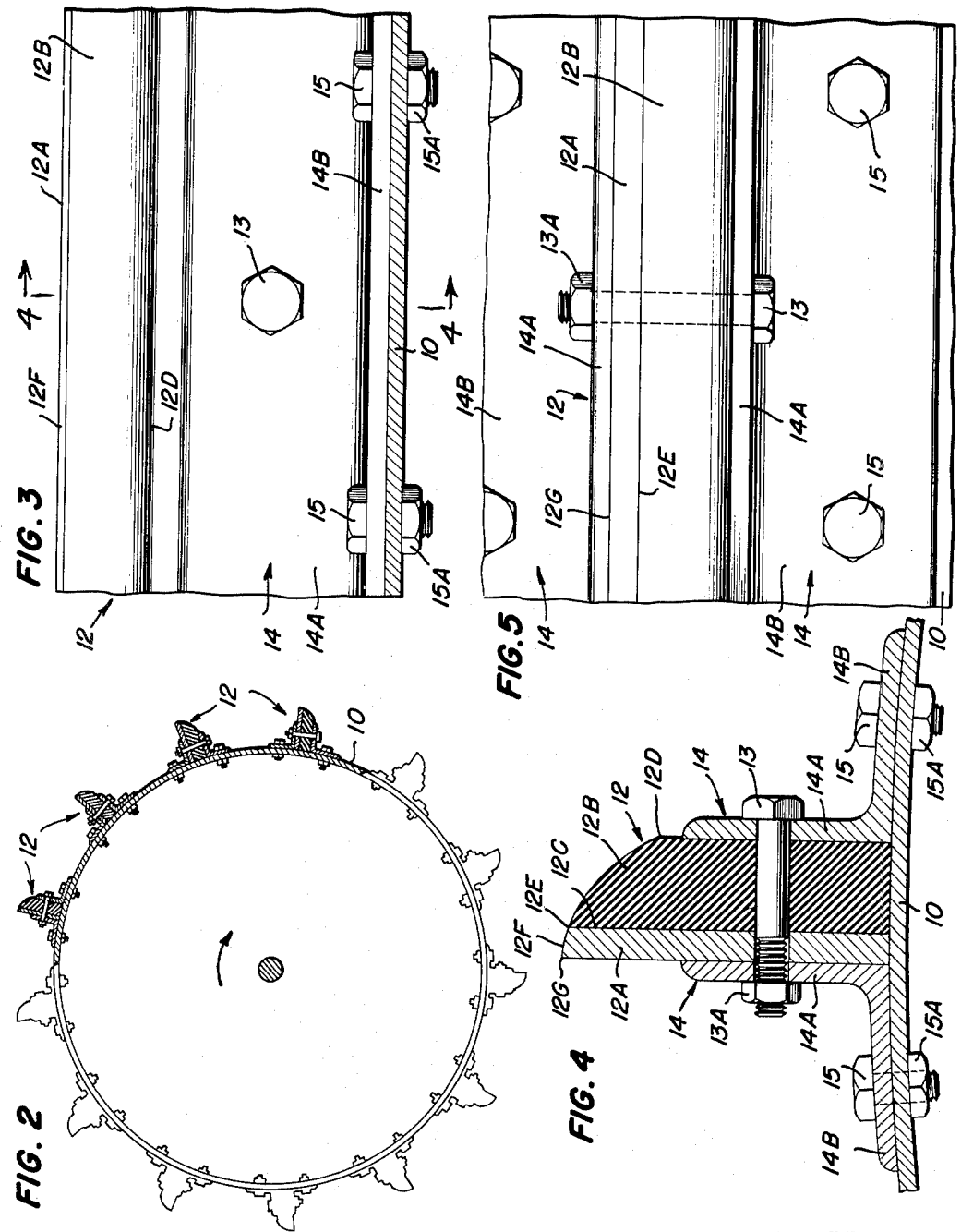

United States Patent Office 2,753,600
Patented July 10, 1956

2,753,600

DECORTICATING APPARATUS

Willis G. Waldo, West Palm Beach, Fla.

Application September 18, 1951, Serial No. 247,057

11 Claims. (Cl. 19—16)

My invention pertains to the removal of fibers from the stalks of abaca, ramie, kenaf and other plants in which the fibers extend longitudinally throughout the length of the stalk; more particularly, it constitutes a novel method and apparatus for decorticating the stalks of such plants with effective separation of the waste material from the fiber.

Among the objects of my invention is the effective removal of the stalk and leaf material from the fiber through a cutting and scraping action and the commercial recovery of the fiber in long, clean and straight condition, substantially free from shive particles, bits of clinging bark and tangles. Other objects include the provision of a method and apparatus which, while having the decorticating advantages of the so-called "raspador" principle, will be free from the large percentage of fiber wasted, lost or made into tangled "noils" which is characteristic of raspador decortication. This is accomplished at fairly high speed, with large hourly capacity and with a minimum investment in plant and buildings.

Other objects and advantages will in part be obvious and in part pointed out later herein, during the course of the following description, when viewed in the light of the accompanying drawings.

My invention accordingly resides in the arrangement of parts, combination of elements, and features of construction, as described herein, the scope of the application of which is more fully set forth in the claims at the end of this specification.

The purpose, application and scope of my invention become evident when one considers the commercial situation in this country respecting the long-fiber plants, such as jute, abaca and flax. These plants, in which the fibers run lengthwise throughout their stalks, furnish the raw materials for the production of burlap fabric and twine (from jute), manila hemp rope and cordage (from abaca) and linen fabrics, cords and threads (from flax). These products find a very large market in the United States. Jute fiber and products alone reach nearly a billion pounds annually.

All of these fibers are imported. Jute is raised, stripped, retted, washed and dried by hand methods in the hot, steaming climate of South India. Abaca or manila hemp does not grow in North America at all. Until World War II the principal source of supply was the Philippines, but when this source became unavailable, the United States turned to Latin America where abaca is now being grown on a large scale on lands of the United Fruit Company, under a $50,000,000 program financed by the United States Government. Flax, grown for fiber, has never been a large commercial crop in the United States. The supply used in this country has come from abroad, where it is harvested, dew-retted, brushed, hackled and dried by well known methods.

For several years efforts have been made to provide domestic substitutes for jute and flax, especially for use in war-time, since experience in World War II showed conclusively that present sources are not to be relied upon in such an emergency. Much progress has been made with kenaf (Hibiscus cannabinus) as a substitute for jute and with ramie (Boehmeria nivea) as a substitute for flax. In certain important respects, both of these fibers have proved to be definitely superior to the fibers for which they have been substituted.

The development of the kenaf, abaca and ramie industries, however, has been made more difficult by the lack of a machine which would decorticate the stalks of these fiber-bearing plants in such a way as to make feasible the rapid recovery of the fiber in commercially suitable condition, with only a small percentage of loss.

The availability of such a machine having large hourly output and reasonable first cost would greatly aid in the development of these fiber industries in the Western hemisphere. Such a machine would also benefit Eastern nations where, as elsewhere, the rates of pay for native labor are rising rapidly and increased output is necessary.

Considering ramie as illustrative, the ramie plant in the field often reaches a height of 6 to 7 feet. The mature stalk comprises from 5 to 6 feet of this, while the immature, succulent upper stalk and leafy top comprise the remaining portion. Typically, the mature stalk is more or less brittle and has a pithy interior. There is a thin, outer skin, green when the stalk is young and becoming brown from the base toward the top as the stalk matures.

The growing ramie may be partially (about 70%) defoliated by chemical dusting before harvesting, after which the stalks are ordinarily cut and bound into bundles by means of a heavy-duty harvester-binder. The remainder of the tops are often cut from these bundles and the stalks are then ready for green decortication.

In bast fiber plants, the fibers are embedded in a band of gums and pectins which forms the bast, or outer portion of the stalk. The removal of this vegetable matter from the fibers constitutes the decortication of the stalk. A scutching operation, in which the stalk matter is cut, scraped or sheared away from the fiber is the commercial method for stalk decortication.

This is the principle of the original decorticator, known as the "raspador" machine, invented in Mexico and developed in Germany. Its principal advantages are high speed and large capacity. The treatment of the green stalks is severe, however, resulting in much breakage of stalks and loss of fiber. Losses as high as 58% of the fiber when working on stiff, green stalks are known to have occurred. Even when working on the stalks of abaca, noted for its coarse, strong fiber, the wastage is reported to exceed 50%.

A second method of decortication of fiber-bearing stalks has recently been developed in which the cutting and breaking of the fibers is reduced by wiping the stalks at comparatively low rotational speeds, by means of flexible wipers which do not cut or tear the stalks. This method of treatment has advantages in producing long, clean and straight fiber. Slow speeds are necessary which reduce hourly capacity and increase the cost of labor and supervision in consequence.

The need has been felt, up to the time of the present invention, for some effective mechanism, or combination of mechanisms, which would combine the rapid operation, economy and high output of raspador machines, utilizing a cutting and shearing action, with the production of high quality fiber made with a low percentage of waste, which is brought about by the flexible wiping technique.

An important object of my invention, therefore, is to provide apparatus which, in a direct, simple and reliable manner, effectively avoids the defects and disadvantages of the prior art apparatus and combines the advantages of several known types of prior art equipment, accomplished in a simple machine, or combination of machines, of rugged construction, economical in first cost, and producing long, straight clean fiber in a rapid and reliable manner.

In the drawings, wherein I have disclosed that embodiment of my invention which I prefer at present, Fig. 1 is a perspective view of apparatus showing certain features of my invention, viz., a revolving scutching device and a corresponding back-plate, positioned closely adjacent thereto and concentric in curvature therewith;

Fig. 2 is a cross-sectional view of the scutching drum construction, certain parts being shown schematically for simplicity;

Fig. 3 is a side elevation of a portion of one of the wipers with which the drum of Fig. 2 is provided;

Fig. 4 is a cross-section taken on the line 4—4 of Fig. 3, through one of the wiper assemblies, while Fig. 5 is a plan view of a portion of the wiper shown in Figs. 3 and 4;

Throughout the several drawings, like reference characters denote like parts.

Figure 1:
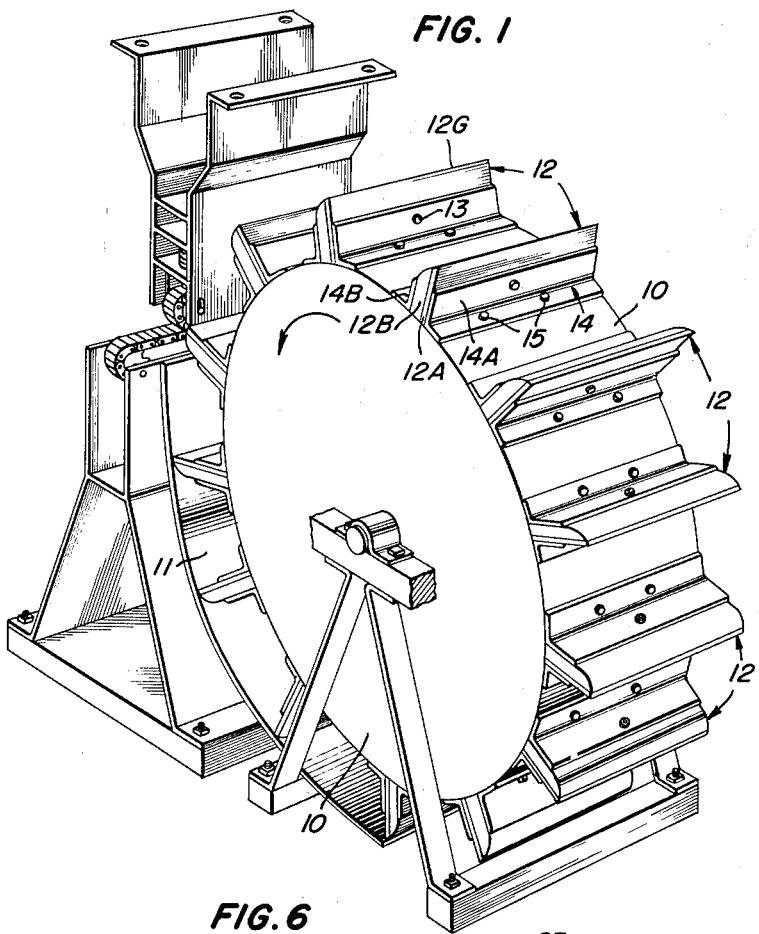

Referring to the drawings, I provide a short drum 10 (two of these drums are required for the complete machine, but since their design and functions are similar, one of them has been omitted for simplicity) which may be formed of any suitable material such as steel. While the dimensions of this drum may be varied to suit the stalks to be decorticated, I find it convenient to make the drum about 16 inches long, with a diameter of say, 8 feet. Associated with drum 10 and in spaced relation thereto, I provide a back-plate 11 (Fig. 1). This back-plate likewise has a length, in this illustration, of about 16 inches. Since it is intended that the edges of the blades 12 (Fig. 1) shall sweep close to the surface of the back-plate, throughout its length the curvature of the face of the back-plate is made concentric with the circle traced by the edges of the blades 12 in their revolution about the center of the drum. I prefer to form this back-plate of stainless steel, since it is ordinarily sprayed with water when operating, and it is desired to avoid the formation of rust on the plate which would stain the fiber. Of course other suitable material may be employed. Drum 10 is of course, mounted on suitable bearings, preferably of ball or roller type.

Damage to the fibers and the production of an excessive amount of waste are avoided by controlling the depth of the "bite" into the stalk, which is taken by the revolving blade upon striking the stalk. To accomplish this, I provide a plurality of rigid wipers evenly spaced about the periphery of the drum, parallel to its axis as shown at 12, in Fig. 2. While the number of these wipers is not necessarily critical, I find it convenient in a drum of this size, to provide say, 12 or 13 of these wipers. Within practical limits, the greater the number of these wipers, the greater is the decorticating capacity of the machine.

Each wiper includes a rigid cutting blade, indicated generally at 12A in Fig. 4. This extends radially outward from the drum 10 and is made removably fast thereto in any convenient manner, such as that described below.

The stalks to be decorticated are placed side by side in a layer some two inches thick, although the thickness of the layer which can be effectively decorticated depends upon the character of the stalks, the speed of the drums and the type of decorticating blade used. The stalks are firmly grasped near the butt ends thereof, by any suitable means, such a pair of suitable grip chains. Such chains or ropes of various kinds are conventional in the art, and disclosure thereof is omitted for simplicity and clarity. These grip chains drag the stalks into and through the annular space between the drum 10 and the back-plate 11, where the decorticating action takes place.

The scraping and shearing action of the revolving wipers of the drums against the stalks being decorticated must be made sufficiently vigorous and severe, by rotating the drums at high speeds, to remove from the fiber the undesired vegetable matter together with the bark covering the plant stalks, since these substances, especially in the stalks of ramie, kenaf and abaca, frequently adhere tightly to the fibers. It is this severe treatment, necessarily at high speeds, which heretofore has resulted in breaking the stalks and the fibers, with consequent waste and loss. I have found that, by facing the bare, rigid, metal blade by a thick protective cushion of suitable material, tough but comparatively soft and yieldable, of which certain grades of rubber are typical, the desired high output per unit of time can be obtained accompanied by an improvement in the quality of the fiber and with a substantial reduction in the waste and loss heretofore observed. Probably such protective action is brought about by cushioning the direct impact of the cutting blade on the fibers and by reducing the momentary strain set up within the fiber during the decorticating. These high, but momentary, strains are relieved by the absorption of part of the shock by the protective cushion.

To achieve this, I provide the decorticating blade 12A (Fig. 4) with a protective facing or cushion 12B. This protective facing, made of rubber, plastic, or other suitable material, is removably applied against the face 12C of the decorticating blade 12A which leads during rotation of drum 10, on which the wiper blade is mounted (Fig. 2) and covers the entire surface or face of the blade. While the thickness of such protective cushion 12B is not necessarily critical, I find it advantageous to make it 3 to 4 times as thick as the decorticating blade 12A.

Protective cushion 12B, being the element of greatest weakness and calculated as such, is exposed to greater wear and can be rapidly replaced when desired, with minimum expense. The facing 12B is made fast to its cooperating decorticating blade 12A in any suitable and convenient manner desired, as by bolt 13 and nut 13A, concerning which more will be said later herein.

The protective cushion 12B extends radially from drum 10 in contact with the decorticating blade to the outer surface thereof. This outer surface of the steel blade which comes into contact with the stalks, may be either straight, slightly curved (as shown in Fig. 4) or ground to shorter radii, up to and including a half circle. The protective cushion 12B terminates in a curve of such shape as to cooperate effectively with the steel blade in decorticating the particular kind of stalks being processed. One effective form of this curve is shown in Fig. 4, in which the point 12D is taken on the outer face of the protective cushion 12B at a distance equal to the thickness of 12B measured radially inward from the point 12E. The curve 12D—12E is a curve of constantly changing radius, which merges smoothly and continuously into the decorticating surface 12F of the blade 12A concluding at edge 12G, so that the junction along the line edge 12E between the blade and the cushion is smooth and unnoticeable. This marked continuity of the outline curve at the edge 12E is not an essential feature of this invention, however, since the protective cushion will co-operate with the blade even when, due to the modified shape of the decorticating surface 12F of the blade 12A, there may be a small trough left all the way along the top of the blade assembly at the edge 12E. The curve 12D—12E is not necessarily a curve of increasing radius; it may be a circular curve or a curve of compound radii or other shape which exerts an increasing wedging action against the stalks. Likewise the curvature of the decorticating surface 12F of the blade 12A may be varied to suit the conditions of operation, as described above. Whatever the profile adopted, it extends, of course, longitudinally along the decorticating blade 12A.

Not only does the protective cushion 12B protect the stalks against the full impact of the rigid steel blades, since the blow is partly cushioned by the facing material, but it also prevents the blade 12A from cutting too deeply into the stalk. It has been observed that the bare blade takes too deep a "bite" into the soft vegetable material of which the stalk is composed. The protecting layer of tough, resilient but non-cutting material composing the facing 12B serves as a guard during the decorticating process. It definitely limits the angle at which the blade strikes the stalk, and achieves the results desired by pushing the green stalks into a position almost tangent to the curve through which the decorticating end of the steel blade sweeps while revolving. The combined results of these two effects definitely reduces the amount of fiber wasted, lost or reduced to tangled tow during decortication. A high percentage of line fiber is recovered even at high drum speeds.

In order to make the facing 12B removably fast to the decorticating blade 12A, I employ two structural angles (which I term brackets) 14, 14 one placed against the back face of the blade 12A and the other against the front face of the protective cushion 12B. These brackets extend along the length of the wiper. Their radial legs 14A clamp together the blade 12A and the facing 12B, a plurality of bolts 13 and cooperating nuts 13A holding the assembly securely together. The horizontal legs 14B, 14B are made removably fast to drum 10 in desired suitable manner such as by the machine bolts 15 and cooperating nuts 15A.

It is to be noted that the "raspador" principle on which this invention operates is entirely different from that employed in machines using flexible wiper blades. The latter remove the vegetable matter from the fiber by means of wipers having no cutting or shearing action, being formed of material not adapted to cutting or shearing, the wiping action being obtained by the bending or yielding of the flexible edges of the blades themselves. In the present application, on the other hand, the blades are of the rigid steel type characteristic of the raspador decorticating machine. Here, however, although the blades are rigid and unbending, the severe scraping and shearing is relieved by absorbing the greater part of the shock of contact between the blade and the stalks by installing a layer of suitable, protective material, which acts to cushion the blow at the moment when the rigid blade strikes the stalk. This protective effect is enhanced by so shaping this cushion that it will act as a guide, serving to force the yieldable vegetable material into a position such that the steel blades will strike the stalks almost tangentially, so that they cannot take too deep a bite into the stalk and thereby break or damage the fiber.

The raspador decorticator equipped with protected blades as described above, will produce high grade fiber when operated at high speeds, provided that the stalks are sufficiently soft and succulent to be crushed and held by the grip chain and decorticated by a scraping action. It is characteristic of bast fiber plants, however, that the central part of the stalk is converted from pith into wood as the plant becomes more and more over-age. In kenaf, the stalks become woody even when only 6 to 8 feet tall.

Woody stalks may be crushed and made flexible without damage to the fiber by passing them between squeeze rolls having plain or fluted surfaces. Passing them lengthwise as an independent operation, is of course well known prior art. It is a slow process and requires much additional equipment and labor if it is not to become a bottleneck in the operations.

Such crushing, moreover, does not lend itself to being a part of a sidewise and continuous feeding of the stalks into the decorticator as is required in operating a machine of the raspador type. Furthermore, the stalks can not be crushed successfully by attempting to pass them through crushing rolls placed parallel to their axes, since the rolls will not take hold of a round stalk in such a position.

There is an intermediate position, however, in which the rolls may be placed, such that it becomes practicable to crush the stalks continuously, in whole or in part, as a part of the feeding operation.

Figure 6:
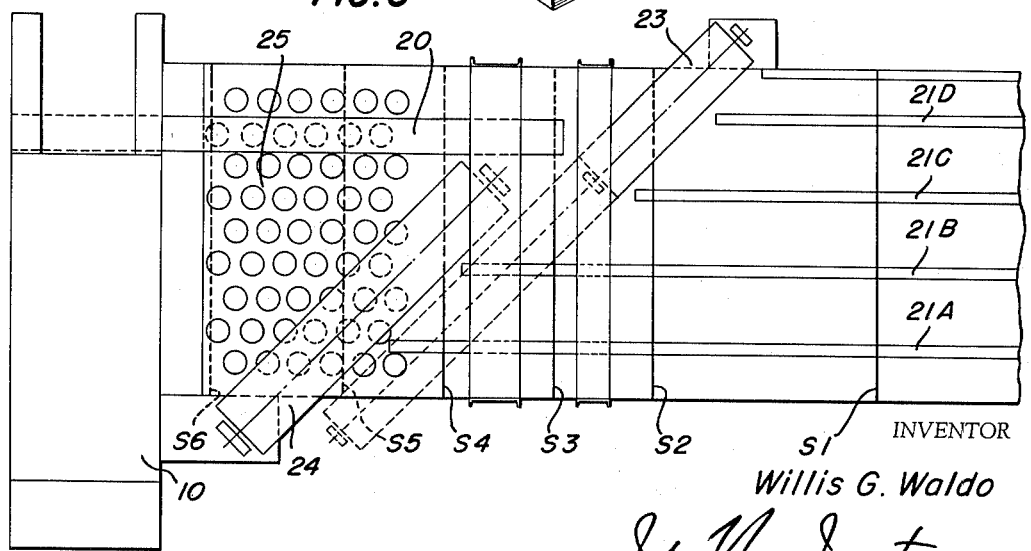
Fig. 6 is a plan view of my apparatus in which squeeze rolls are employed.

A necessary part of a raspador decorticator is the feeding conveyor on which the stalks to be decorticated are carried sidewise within reach of the grip chain, by a series of parallel carrier chains. Figure 6 shows a partial view of such a feeding conveyor. The stalks are carried into the grip chain 20 by the carrier chains 21A, 21B, 21C, 21D and the successive positions of the stalk are shown at $S_1$, $S_2$ etc. It may be necessary to crush only the butt ends of the stalks to give the grip chain a better hold on them and to increase the number of stalks per lineal foot which the grip chain will hold at one time.

In such a case only a short pair of fluted rolls (the upper roll being shown at 23) is required. This pair of rolls, so placed that the stalks are fed between them by the carrier chains, crushes the stalks for a short distance at their butt ends, and feeds them into the grip chains, shown in plan at 20. As shown in Fig. 6, the stalks move parallel to each other and sidewise through the rolls, at an angle of 45 degrees with the axes of the rolls. The grip chain is readily able to deform and hold tightly the soft, crushed ends of the stalks and drags them into the annular space between drum 10 and back-plate 11, where they are decorticated.

If the stalks are too woody to be decorticated in their natural condition, a second pair of power-driven squeeze rolls 24 is so mounted that the stalks will pass between them for their entire remaining length; or the rolls 24 may be lengthened to take the place of both pairs of rolls, 23 and 24. As the stalks leave the diagonal crushing rolls they are passed across a vibrating portion 25 of the conveyor deck which separates most of the broken woody pith from the crushed stalks. The woody pith drops through openings in the deck, onto a conveyor belt for further processing or to go to the waste dump.

The novel feature of this modification of the raspador machine is the sidewise feeding in the ordinary way of stalks too hard and woody to be held by the grip chain or to be decorticated without a prohibitive percentage of waste. Such stalks are fed into the machine without preparatory treatment, the continuous feeding, crushing and decorticating being combined in a single machine. This eliminates lengthwise crushing or ribboning as a separate preliminary operation requiring separate machines and much additional labor. Such separate preliminary treatment produces excellent fiber with much reduced waste.

The squeeze roll, when combined with the decorticator, functions on hard, woody stalks just as it does when it is operating independently. Not so the decorticator. This machine which will not function at all on such material, or will do so only by producing a prohibitive percentage of waste, functions in a positive economical way, accompanied by but little waste, when operated as a part of such a combination, and the combination result is evident and important.

The grip chain is designed to hold the stalk by crushing and deforming it. If fed stalks so hard that the action of the grip chain will not crush them, then the smooth round stalks are not deformed, the grip chain cannot hold them and they fall out as soon as the revolving blades of drum 10 strike them, and the machine does not function as designed. By providing the crushing rolls or preliminary crushing of the stalks, independently or jointly as part of the feeding operation, however, the material fed between the grip chains is soft and succulent. The grip chains can easily deform it and hold it firmly and the machine functions as designed.

There is also a second important combination result. In the process of decortication it is necessary for the stalk to bend in order that it may pass through the annular space between drum 10 and back-plate 11. This it is forced to do, being dragged into this space by the grip chain and compelled to take the curved shape of the back-plate by the action of the revolving blades. This forced bending of the brittle kenaf stalks results in the complete breakage of a large percentage of them. These broken stalks drop out of the machine and carry their fiber with them, since the breakage occurs before the stalks have been decorticated. The result is a wastage often exceeding 50 percent of the fiber fed into the machine, in undecorticated form.

When the stalks have been made flexible either by building a crushing roll into the feeding end of the decorticator or by otherwise crushing and/or fracturing the stalks, this breakage is almost completely eliminated. The loss of fiber in this combination machine, from all sources, when working on the brittle, woody but crushed stalks of kenaf was found in a test to be only about 7 percent. The difference between a 50 percent loss and a 7 percent loss may easily make the difference between failure and success of the enterprise. If it takes the earnings of half the capacity of the machine to pay expenses, then the profits must come out of the second half of the machine's capacity. But if this second half of the capacity is wasted, there would be no profits. If, however, the waste can be reduced to 7 percent, by combining a squeeze roll with the decorticator, then the machine so equipped will recover 93 percent of the undecorticated fiber fed into it, and there will be substantial profits to assure success of the enterprise.

Although it is true, therefore, that in the combined use, separately or jointly, of a raspador type decorticator and a squeeze roll (one or more) operating on sufficiently hard, brittle, woody stalks, the squeeze roll continues to function as it did before, there is a radical difference in the functioning of the decorticator, for, as a result of the combination, the machine now holds and decorticates economically, stalks which, previously, it could neither hold nor decorticate, or at most, could decorticate only by producing a large percentage of waste.

It might also be contended that nothing has been accomplished by combining the squeeze roll(s) and the decorticator in a single machine, which would not be accomplished by operating them separately—first, squeezing the stalks as a preliminary and separate operation and second, feeding the squeezed material into the decorticator. Such, however, is not the case. The percentage of recoverable fiber contained in the green stalks of bast fiber plants, is low, averaging from not over 6 percent in kenaf, to 2.5 percent or less, in some kinds of ramie. It is therefore necessary to handle anywhere from 17 to 40 tons or more, of green stalks per hour in order to obtain one ton of dry decorticated fiber per hour. Taking 25 tons per hour as a representative figure, the squeezing of 25 tons of stalks through many pairs of squeeze rolls as a separate operation, conveying the limp material to the feeding conveyor of the decorticator and carrying it sidewise into a decorticator of the raspador type, would call for a substantial increase in plant investment and labor. It would more than double the cost of preliminary handling and would increase the cost of operation to such a degree that it is safe to say that, other things being equal, a plant in which the stalks had to be prepared by independent squeezing and then fed into the decorticator could not compete with one in which the unprepared stalks could be fed directly into the decorticator and fully processed with the separation and recovery of the woody pith in a single operation.

Not only is it a matter of economics, but of physical condition of the material fed into the decorticator and therefore of the quality of the product. No decorticator will produce clean, straight, untangled fiber from stalks which have become intertwined and tangled in a preliminary operation. To squeeze 25 tons of long, green stalks in an hour, convey them to the feeding conveyor and arrange them thereon and put them through the decorticator without tangling would be difficult, especially with ramie, which tangles very easily, especially when the stalks have been crushed. Much tangling would certainly occur.

A combination machine taking whole stalks and delivering decorticated fiber, is therefore capable of performing in a smooth, rapid and reliable manner not obtainable by squeezing and decorticating separately. Such a machine produces results that cannot be duplicated in time or cost by the separate and successive operation on the stalks by the squeeze roll and the decorticator as described above. The separate and successive operation on the stalks by the squeeze roll, or other form of ribboning machine, and subsequent decortication in the decorticator of the resulting crushed stalks and/or ribbons more or less free from wood or pith is a feasible, commercial operation however and produces good fiber with little waste.

Since many embodiments of my new apparatus will readily occur to those skilled in the art, I intend the foregoing disclosure to be construed simply as illustrative and not as comprising limitations.

I claim as my invention:

1. In a decorticating machine, the combination of a cylindrical wiper drum having a plurality of wipers extending radially from, and disposed longitudinally along said drum about the periphery thereof, and a back-plate cooperating with said drum and of complemental configuration thereto and spacing therefrom, each said wiper comprising a radially-extending rigid decorticating blade having a decorticating surface on the outer extremity thereof, and means facing the leading surface of each said cutting blade, formed of soft, yieldable material and directing the fiber-bearing stalks undergoing decortication radially outward toward said back-plate so that the stalks will be fed into the path of the decorticating surface and between the latter and the said back-plate.

2. In a decorticating machine, a short-cylindrical decorticating drum and a back-plate of configuration complemental to and cooperating with that of said drum, said drum having a plurality of wipers removably provided about its periphery and extending longitudinally thereof, each said wiper comprising a radially-extending, rigid decorticating blade having a decorticating surface on the outer extremity thereof and provided with a yieldable protective facing on the leading surface thereof, said facing having a rounded outer surface extending outwardly and rearwardly toward the rigid decorticating blade and merging into the decorticating outer surface thereof.

3. As part of a decorticating machine, including a cooperating back-plate, a cylindrical wiper drum having a plurality of wipers extending longitudinally of, and disposed about, the periphery of said drum, each said wiper comprising a rigid decorticating blade extending radially outward from the surface of the drum and having a decorticating surface at the outer end thereof, and a protective facing on the leading surface of said blade, formed of soft, yieldable material and curved at its outer end, outwardly and rearwardly, in a peripheral curve approximately merging into the decorticating surface of said blade.

4. As part of a decorticating machine including a cooperating back-plate, a cylindrical wiper drum having a plurality of wipers extending longitudinally of and disposed about the periphery of said drum, each said wiper comprising a rigid decorticating blade extending radially outward from the surface of the drum and having a decorticating surface at the outer end thereof and a protective facing on the leading surface of said blade, formed of soft, yieldable material and curved at its outer end, outwardly and rearwardly, in a peripheral curve merging into the decorticating surface of said blade, each wiper including means for clamping together the said blade and facing therefor and for removably securing the wiper to the drum.

5. As a new article of manufacture, a wiper for decorticating fibrous materials, comprising a rigid blade portion having a terminal decorticating surface and a protective yieldable cushion along the longitudinal extent of the blade terminating in the region of said decorticating surface and having a terminal surface sloping outwardly and rearwardly in a sweeping curve which merges into said decorticating surface.

6. As a new article of manufacture, a wiper for decorticating fibrous materials, comprising a rigid blade portion having a terminal decorticating surface and a protective yieldable cushion along the longitudinal extent of the blade, terminating in the region of said decorticating surface and having a terminal surface sloping outwardly and rearwardly in a sweeping curve which merges into said decorticating surface, cooperating clamping means between which said blade and said protective cushion are mounted, and means for securing together said blade, protective cushion and clamping means as a unit.

7. A wiper for a decorticating machine comprising a rigid blade having a decorticating surface at one end thereof, and a protective cushion removably secured to that longitudinal surface of the decorticator blade which leads during operation and formed of soft, yieldable material having a thickness approximately three to four times that of the decorticating blade and terminating at its outer surface adjacent to the decorticating end of said rigid blade, in a rounded, sweeping and outwardly and rearwardly extending curve, approximately merging into said decorticating surface of said blade.

8. A machine for decorticating fiber-bearing stalks, said machine comprising a rigid, concave, back-plate, having a smooth, continuous surface, for continuously and unyieldably backing said stalks; means for reducing said stalks to flexible ribbons in a continuous manner; means for continuously passing said ribbons across said plate; and rigid blades revolving uniformly and closely to said plate and being movable along the lengths of the flexible stalks or ribbons on said plate, said blades having a protective cushion removably secured to that longitudinal surface of said decorticating blade which leads during operation, said cushion being formed of soft, yieldable, but tough material and having an end surface sloping outwardly and rearwardly in a sweeping curve merging into the decorticating surface of said blades.

9. A machine for decorticating fiber-bearing stalks, said machine comprising a rigid, concave, back-plate having a smooth, continuous surface for continuously and unyieldably backing said stalks; means for reducing said stalks to flexible ribbons and for continuously passing said ribbons across said plate; and a rotatable drum coacting with said plate having mounted thereon rigid wiper blades, having a protective cushion removably secured to that longitudinal surface of said wiper blades which leads during operation, formed of soft, yieldable but tough material and having an end surface sloping outwardly and rearwardly in a sweeping curve merging into the decorticating surface of said blades.

10. A machine for decorticating fiber-bearing stalks, comprising a rigid, concave back-plate having a smooth, continuous surface for continuously and unyieldably backing said stalks; means for reducing said stalks to flexible ribbons and for continuously passing said ribbons across said plate with their strands extending along the surface thereof; means for projecting streams of water onto said stalks or ribbons as same move across the plate; and rigid wiper blades each having a leading surface and a terminal decorticating surface and each having a protective cushion along said leading surface, with the outer surface of said protective cushion merging into the decorticating surface of the blade and coacting with the back-plate to exert a scraping pressure against said stalks or ribbons, thereby removing the waste material from the fiber thereof.

11. A machine for decorticating fiber-bearing stalks, comprising a concave, rigid, back-plate having a smooth, continuous surface for continuously and unyieldably backing said stalks; means for reducing said stalks to flexible ribbons as a preliminary operation; means for hanging and moving a plurality of stalks or ribbons over said plate so that they move across said plate while extending along the bearing surface thereof, and including upper and lower gripping means for holding and conveying one end of said stalks, ribbons or partly decorticated material along and adjacent to the top of said back-plate for its full length and transversely to their own lengths; a rotatable drum substantially coaxial with said back-plate and cooperating therewith; and rigid wiper blades, each having a leading surface and a terminal decorticating surface with flexible protective facing on said leading surface having an outermost surface merging into the decorticating surface of the blade, mounted lengthwise along said drum, for bearing against the stalks or ribbons with firm, continuous pressure and scraping, cutting or otherwise removing the waste material from the fibers thereof.

References Cited in the file of this patent

UNITED STATES PATENTS

| | | |
|---|---|---|
| 439,913 | Weicher | Nov. 4, 1890 |
| 801,191 | Hall | Oct. 3, 1905 |
| 1,010,006 | Worth | Nov. 28, 1911 |
| 1,677,076 | Dufour | July 10, 1928 |
| 1,741,543 | Simons | Dec. 31, 1929 |
| 2,404,457 | Reeves | July 23, 1946 |
| 2,551,128 | Hulfish et al. | May 1, 1951 |
| 2,551,129 | Hulfish et al. | May 1, 1951 |
| 2,551,855 | Selvig | May 8, 1951 |
| 2,576,406 | McCrae et al. | Nov. 27, 1951 |

FOREIGN PATENTS

| | | |
|---|---|---|
| 377,545 | Great Britain | July 28, 1932 |